(12) United States Patent
Wu

(10) Patent No.: US 7,898,823 B2
(45) Date of Patent: Mar. 1, 2011

(54) QUASI-RESONANT FLY-BACK CONVERTER WITHOUT AUXILIARY WINDING

(75) Inventor: Tsung-Hsiu Wu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 846 days.

(21) Appl. No.: 11/745,460

(22) Filed: May 8, 2007

(65) Prior Publication Data
US 2008/0278974 A1 Nov. 13, 2008

(51) Int. Cl.
*H02M 3/335* (2006.01)
(52) U.S. Cl. .................. 363/21.12; 363/21.18
(58) Field of Classification Search ........... 363/21.01, 363/21.03, 21.12, 21.18, 19, 97
See application file for complete search history.

(56) References Cited

U.S. PATENT DOCUMENTS 5,729,443 A * 3/1998 Pavlin ................... 363/21.12

6,469,484 B2 * 10/2002 L'Hermite et al. .......... 363/97
6,587,361 B2 * 7/2003 Preller ..................... 363/21.01

OTHER PUBLICATIONS

Adragna, Application Note AN1326, Feb. 2001, ST Microelectronics, pp. 1-28.*

* cited by examiner

*Primary Examiner*—Bao Q Vu
*Assistant Examiner*—Jue Zhang
(74) *Attorney, Agent, or Firm*—Winston Hsu; Scott Margo

(57) ABSTRACT

Disclosed is a switching converter without an auxiliary winding. The switching converter has a transformer, a switching transistor, a coupling circuit and a regulating circuit. The transformer has a primary winding and a secondary winding, and is for transforming an input voltage into an output voltage; a first end of the switching transistor is coupled to the primary winding of the transformer, and the switching transistor is for controlling an operation of the transformer according to a control signal; the coupling circuit is for coupling a signal at the first end of the switching transistor to generate a coupled signal; and the regulating circuit is for detecting the coupled signal to generate the control signal according to the detecting result.

9 Claims, 4 Drawing Sheets

QUASI-RESONANT FLY-BACK CONVERTER WITHOUT AUXILIARY WINDING

BACKGROUND OF THE INVENTION

1. Field of the Invention

The invention relates to a power converter, and more particularly, to a switching converter that reduces switching loss without an auxiliary winding implemented.

2. Description of the Prior Art

FIG. 1 illustrates a conventional quasi-resonant fly-back converter, capable of reducing switching loss and switching noise. The converter 100 shown in FIG. 1 includes a transformer T having a primary winding $L_P$ and a secondary winding $L_S$, and a power switching transistor $Q_1$ coupled to the primary winding $L_P$ of the transformer T. When the power switching transistor $Q_1$ is on, the input energy of the converter 100 originating from the input voltage $V_{IN}$ at the input end is stored into the transformer T, and when the power switching transistor $Q_1$ is off, the energy stored in the transformer T is transferred to the output end, forming a DC output voltage $V_{OUT}$ at the load 101. The switching operation of the power switching transistor $Q_1$ is decided by a regulator circuit comprising a zero-cross detecting circuit 102, a delay circuit 103, a waveform shaping circuit 104 and a control circuit 105 as shown in FIG. 1.

In order to operate the converter 100 in a discontinuous conduction mode (DCM) for reducing the switching loss and switching noise, it is necessary to detect when the primary winding $L_P$ of the transformer T is demagnetized; that is, the timing when the secondary current $I_S$ reaches zero. In FIG. 1, by measuring a voltage drop of an auxiliary winding $L_B$, the demagnetization timing of the transformer T is detected, and the regulating circuit then turns on the power switching transistor $Q_1$ to reduce the switching loss. Further description associated with the operation of each circuit component shown in FIG. 1 is detailed in U.S. Pat. No. 5,497,311, and is omitted here for brevity.

The auxiliary winding $L_B$, however, represents an additional element that increases manufacturing cost. Elimination of the auxiliary winding $L_B$ used to detect demagnetization is beneficial as it reduces the overall manufacturing cost of the converter 100.

FIG. 2 shows another conventional structure of a quasi-resonant fly-back converter 200 without an auxiliary winding. In the quasi-resonant fly-back converter 200, when the secondary current $I_S$ reaches zero, the voltage across a drain and a source of the power switching transistor 201 drops off sharply, thereby generating a negative spike in the gate voltage $V_G$. The negative spike is detected by a comparator 202 using a threshold voltage $V_{TH}$, and the comparator 202 provides a DEMAG signal to a PWM (pulse width modulation) regulator 203 according to a comparison result. The PWM regulator 203 enables the power switching transistor 201 by controlling a first transistor S1 and a second transistor S2 to turn on the power switching transistor 201. Further description associated with operation of each circuit component shown in FIG. 2, such as the one shot circuit 206 and the feedback circuit, etc. is detailed in U.S. Pat. No. 6,469,484, and is therefore omitted here for brevity. Although the fly-back converter 200 does not need an auxiliary winding to detect the demagnetization of the transformer 204, it still utilizes a complicated demagnetization detection circuit. The resistor 205 with high resistance and the one shot circuit 206 both raise the manufacturing cost accordingly.

SUMMARY OF THE INVENTION

Therefore, one objective of the present invention is to provide a switching converter, which can detect the demagnetization of the transformer of the switching converter without utilizing an auxiliary winding and a complicated detection circuit. Hence, the present invention can provide a voltage converting function with low/minimized switching loss, switching noise and manufacturing cost.

According to an exemplary embodiment of the present invention, a switching converter is disclosed. The switching converter comprises a transformer, a switching transistor, a coupling circuit and a regulating circuit. The transformer comprises a primary winding and a secondary winding, and is for transforming an input voltage into an output voltage; the switching transistor is for controlling an operation of the transformer according to a control signal, where a first end of the switching transistor is coupled to the primary winding of the transformer and a control end of the switching transistor is for receiving a control signal; the coupling circuit is coupled to the switching transistor, and is for coupling a signal at the first end of the switching transistor to generate a coupled signal; and the regulating circuit is coupled to the switching transistor and the coupling circuit, and is for detecting the coupled signal to generate a detecting result and generating the control signal according to the detecting result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
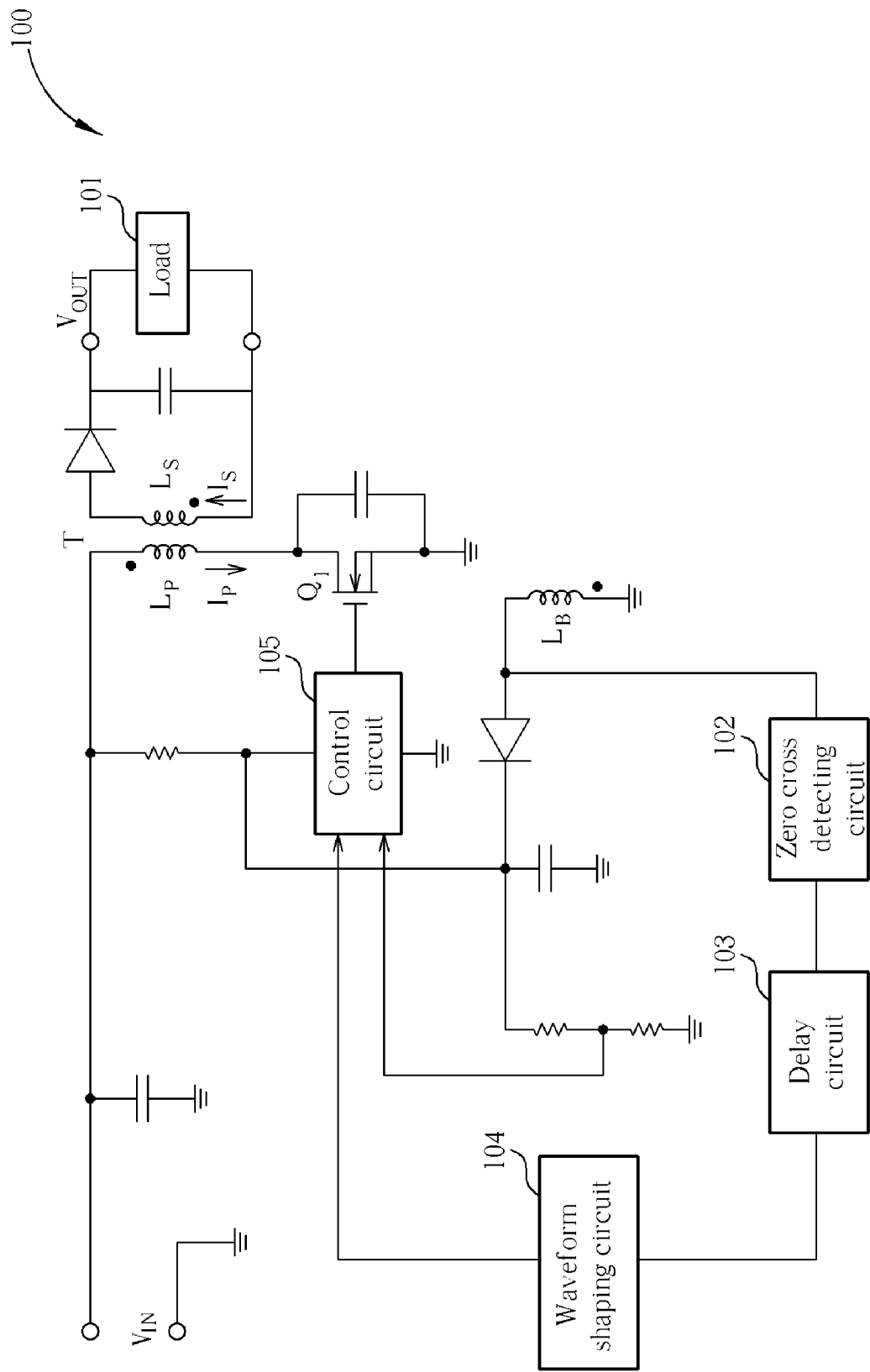
FIG. 1 is a diagram of a conventional quasi-resonant fly-back converter.
Figure 2:
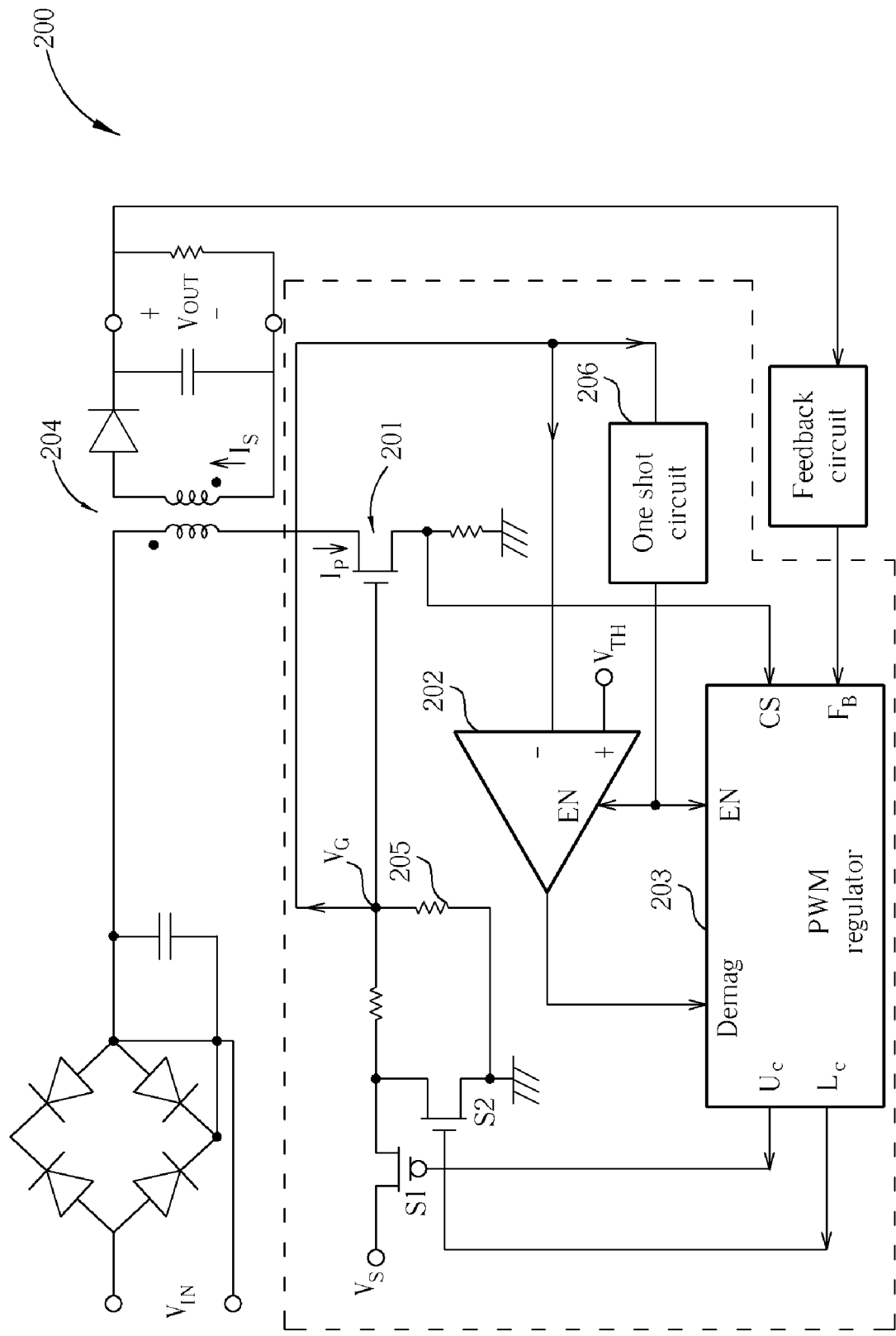
FIG. 2 is a diagram of another conventional quasi-resonant fly-back converter.
Figure 3:
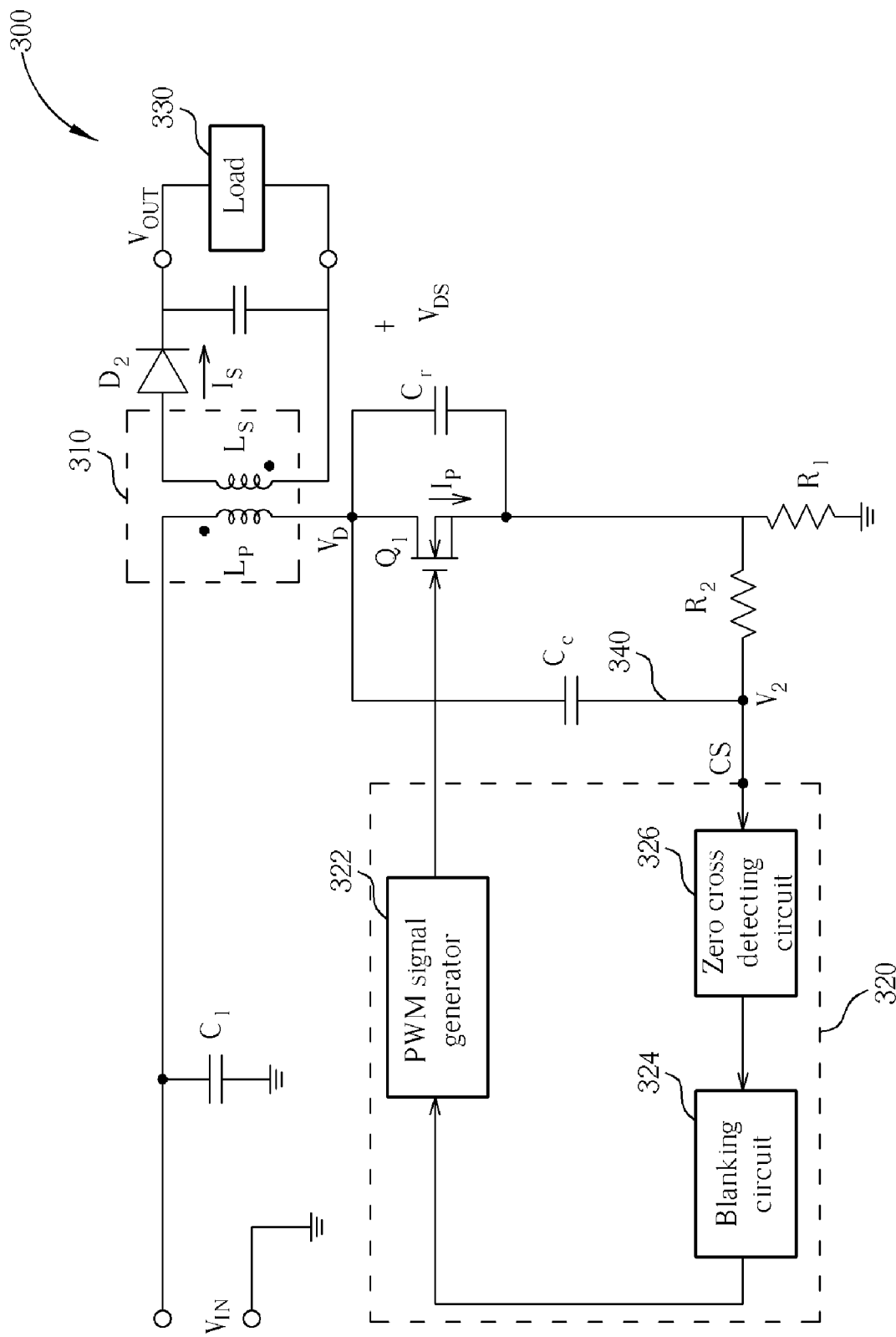
FIG. 3 is a diagram of a quasi-resonant fly-back converter according to an exemplary embodiment of the invention.

Please refer to FIG. 3, which is a diagram of a quasi-resonant fly-back converter according to an exemplary embodiment of the invention. The quasi-resonant fly-back converter 300 comprises a transformer 310, a switching transistor $Q_1$, a coupling circuit 340, which is implemented by a capacitor $C_c$ in this embodiment, a regulating circuit 320, and an amplifying circuit which comprises a resistor $R_2$ coupled between the regulating circuit 320 and a current sensing resistor $R_1$ in this embodiment, wherein the resistance of $R_2$ is greater than the resistance of $R_1$. The transformer 310 comprises a primary winding $L_P$ and a secondary winding $L_S$. The primary winding $L_P$ and the secondary winding $L_S$ are wound on the same core of the transformer 310, but the primary winding $L_P$ is further coupled to the drain of the switching transistor $Q_1$. The switching transistor $Q_1$ has a control end (i.e. a gate terminal when the switching transistor $Q_1$ is implemented by a metal-oxide semiconductor field-effect transistor) for receiving a control signal generated by the regulating circuit 320, and controls the operation of the transformer 310 according to the control signal. When the switching transistor $Q_1$ is turned on by the control signal generated from the regulating circuit 320, the energy of the input voltage $V_{in}$ is stored in the transformer 310, and no current flows through the secondary winding $L_S$ because the diode $D_2$ is inverse biased by the voltage induced by the secondary winding $L_S$. When the switching transistor $Q_1$ is turned off, the energy stored in the primary winding $L_P$ is transferred to the secondary winding $L_S$ due to the forward biased diode $D_2$, and is then supplied to the load 330. The coupling circuit 340 is coupled between the switching transistor $Q_1$ and a current sensing pin CS of the regulating circuit 320, wherein the current sensing pin CS is utilized to sense a current flow through the switching transistor $Q_1$ when the switching transistor $Q_1$ is on, and is utilized to detect the demagnetization of the transformer 310 when the switching transistor $Q_1$ is off.

Since the operation of the quasi-resonant fly-back converter 300 converting an AC input voltage $V_{in}$ into a DC output voltage $V_{OUT}$ is well known by those skilled in the art, detailed descriptions of how the capacitance $C_1$, $C_2$, diode $D_2$ and current sensing resistor $R_1$ operate are omitted here for the sake of brevity. The following will focus on how to detect the demagnetization of the transformer 310 without an auxiliary winding. Therefore, circuit components that are not related to the detection, for example, a feedback circuit shown in the prior art, are omitted in FIG. 3.

Figure 4:
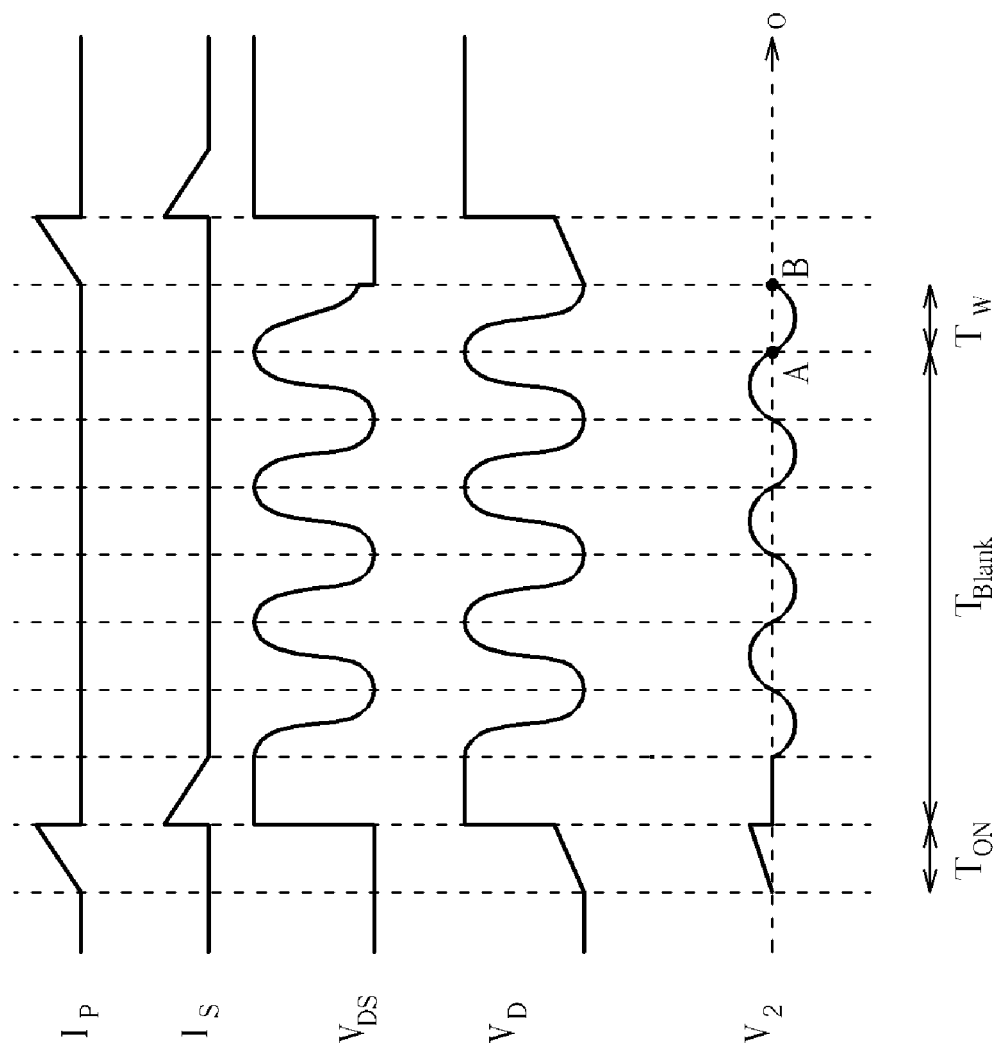
FIG. 4 is a waveform diagram of signals related to the demagnetization detection of the quasi-resonant fly-back converter shown in FIG. 3.

Please refer to FIG. 4 in conjunction with FIG. 3. FIG. 4 is a waveform diagram of signals related to the demagnetization detection performed by the quasi-resonant fly-back converter shown in FIG. 3. The regulating circuit 320 comprises a zero-cross detecting circuit 326, a blanking circuit 324 and a PWM signal generator 322. The PWM signal generator 322 generates the control signal to control the switching transistor $Q_1$ according to the detecting result of the zero-cross detecting circuit 326. When the control signal generated by the PWM signal generator 322 turns on the switching transistor $Q_1$, the primary current $I_P$ increases with a slope or inclination of $V_{in}/L_P$, as indicated by the waveform in FIG. 4. After a time period $T_{ON}$, the energy stored in the transformer 310 is released from the secondary winding Ls and charges the capacitor $C_2$, therefore the current $I_S$, flowing in the diode $D_2$, decreases with a slope of approximately—$V_{OUT}/L_S$ and soon becomes zero. When the current $I_S$ is almost zero, the diode $D_2$ is turned off, and the secondary winding $L_S$ is shifted to a high impedance state. As a result, voltage in the primary winding $L_P$ starts to resonate at time periods determined by the inductance $L_P$ and parasitic capacitance Cr, as can be seen in terms of voltage $V_{DS}$ shown in FIG. 3.

As switching loss of the switching transistor $Q_1$ is typically expressed by $0.5*(Cr)*V_{DS}*V_{DS}*f$, where f is the switching frequency, the switching loss can be minimized by reducing the drain to source voltage $V_{DS}$, that is, turning on the switching transistor $Q_1$ at the time when the resonance waveform of $V_{DS}$ is at the lowest point (lowest voltage level). Since the capacitance $C_C$ is coupled between the drain of the switching transistor $Q_1$ and the current sensing pin CS of the regulator circuit 320, making the phase of the voltage signal $V_2$ be shifted 90 degrees from the voltage signal $V_D$, the lowest point of $V_{DS}$ corresponds to a zero-crossing point of $V_2$. Therefore, as shown in FIG. 3, the regulating circuit 320 utilizes the zero-cross detecting circuit 326 to detect the zero-crossing point of $V_2$, and the PWM signal generator 322 generates the control signal to turn on the switching transistor $Q_1$ according to the detecting result of the zero-cross detecting circuit 326. In this way, the quasi-resonant fly-back converter 300 can have the lowest switching loss and switching noise without using an auxiliary winding and an additional Demag pin needed in the prior art.

The zero crossing point detected by the zero-cross detecting circuit 326 can be a zero crossing point on a rising edge of $V_2$ (i.e. point B indicated in FIG. 4) or a zero crossing point on a falling edge of $V_2$ (i.e. point A indicated in FIG. 4). The zero crossing point, such as point A, corresponds to a highest point (highest voltage level) of $V_{DS}$, while the zero crossing point, such as point B, corresponds to a lowest point (lowest voltage level) of $V_{DS}$. Therefore, the PWM signal generator 322 generates the control signal when the zero-cross detecting circuit 326 detects a zero crossing point on the rising edge of $V_2$, or generates the control signal after a period of time corresponding to $T_W$ when the zero-cross detecting circuit 326 detects the zero crossing point on the falling edge of $V_2$. The zero-cross detecting circuit 326 can be simply implemented by a comparator which compares the voltage level of $V_2$ with a threshold to determine whether the voltage level is zero, and the type of the zero crossing point detected by the comparator, i.e. type A or type B, can be distinguished. The point A corresponds to a rising edge of the detection result (which is a pulse) outputted by the comparator, while the point B corresponds to a falling edge of the detection result. Although the above-mentioned zero-cross detecting circuit 326 detects two type of zero-crossing point, the zero-cross detecting circuit 326 can be configured to detect only one type of zero-crossing point, and in this situation, the PWM signal generator 322 is modified accordingly to generate substantially the same control signal to the switching transistor $Q_1$.

The blanking circuit 324 is for blanking the detecting result of the zero-cross detecting circuit 326 during a blanking time period $T_{Blank}$ corresponding to a switching frequency of the quasi-resonant fly-back converter 300. Hence, the PWM signal generator 322 only receives the detecting result of the zero-cross detecting circuit 326 and turns on the switching transistor $Q_1$ after the blanking time period $T_{Blank}$. The function of the blanking circuit 324 is to further reduce the switching loss of the quasi-resonant fly-back converter 300 by limiting the switching frequency.

Moreover, because the resistance of $R_2$ is greater than the resistance of $R_1$, $R_2$ in conjunction with $R_1$ forms a voltage divider that can amplify $V_2$ to make the detection performed by the regulating circuit 320 more precise. However, if $R_2$ is removed from the quasi-resonant fly-back converter 300, the function of the quasi-resonant fly-back converter 300 should not be influenced seriously under certain cases. This alternative design still obeys the spirit of the present invention.

Note that, in the above embodiment, the coupling circuit is implemented by a capacitor; however, this is not meant to be a limitation of the present invention. Other capacitance elements or elements which can provide a similar function to the capacitor $C_C$ can also be utilized. These modifications of the circuit all fall within the scope of the present invention.

Those skilled in the art will readily observe that numerous modifications and alterations of the device and method may be made while retaining the teachings of the invention.

What is claimed is:

1. A switching converter, comprising:
   a transformer, comprising a primary winding and a secondary winding, for transforming an input voltage into an output voltage;
   a switching transistor, a first end of which is directly connected to the primary winding of the transformer and a control end of which is for receiving a control signal, for controlling operation of the transformer according to the control signal;
   a coupling circuit, having a first terminal directly connected to the first end of the switching circuit, for generating a coupled signal at a second terminal of the coupling circuit according to a voltage signal at the first end of the switching transistor; and
   a regulating circuit, directly connected to the second terminal of the coupling circuit, for receiving the coupled signal and accordingly generating a detecting result, and generating the control signal according to the detecting result;
   wherein the voltage signal at the first end of the switching transistor is different from the coupled signal at the second terminal of the coupling circuit;
   wherein the regulating circuit comprises:
   a zero-cross detecting circuit, coupled to the coupling circuit, for detecting a zero-crossing point of the coupled signal and generating the detecting result; and
   a pulse width modulation (PWM) signal generator, coupled to the switching transistor, for generating the control signal to control the switching transistor according to the detecting result.

2. The switching converter of claim 1, wherein the coupling circuit is coupled between the switching transistor and a current sensing pin of the regulating circuit, wherein the current sensing pin is utilized to sense a current flow through the switching transistor when the switching transistor is on, and is utilized to detect a demagnetization of the transformer when the switching transistor is off.

3. The switching converter of claim 1, wherein the coupling circuit comprises a capacitive element, a first end of which is coupled to the first end of the switching transistor, and a second end of which is coupled to a second end of the switching transistor and the regulating circuit.

4. The switching converter of claim 1, wherein the regulating circuit further comprises:
   a blanking circuit, coupled to the zero-cross detecting circuit and the PWM signal generator, for blanking the detecting result of the zero-cross detecting circuit during a blanking time period corresponding to a switching frequency of the switching converter.

5. The switching converter of claim 1, wherein the PWM signal generator generates the control signal when the zero-cross detecting circuit detects a zero crossing point on a rising edge of the coupled signal, and generates the control signal after a period of time when the zero-cross detecting circuit detects the zero crossing point on a falling edge of the coupled signal.

6. The switching converter of claim 1, further comprising an amplifying circuit, coupled to the regulating circuit, for amplifying the coupled signal input to the regulating circuit.

7. The switching converter of claim 6, wherein the amplifying circuit comprises a resistor, directly connected between the second terminal of the coupling circuit and a current sensing resistor, and the resistance of the resistor is greater than that of the current sensing resistor.

8. A switching converter, comprising:
   a transformer, comprising a primary winding and a secondary winding, for transforming an input voltage into an output voltage;
   a switching transistor, having a drain end connected to the primary winding and a gate end for receiving a control signal, thereby controlling operation of the transformer according to the control signal;
   a capacitor, having a first terminal connected to the drain end of the switching transistor, for generating a coupled signal at a second terminal of the capacitor according to a voltage signal at the drain end of the switching transistor;
   a regulating circuit, for receiving the coupled signal and accordingly outputting the control signal according to the detecting result, wherein the regulating circuit is connected to the capacitor with a current sensing pin, utilized to sense a current flow through the switching transistor when the switching transistor is on, and utilized to detect a demagnetization of the transformer when the switching transistor is off; and
   an amplifying circuit, coupled to the capacitor and the regulating circuit, for amplifying and transmitting the coupled signal to the regulating circuit, wherein the amplifying circuit comprises a resistor connected between the current sensing pin and a current sensing resistor, the resistor and the current sensing resistor are jointly connected to a source end of the switch transistor, and the resistance of the resistor is greater than that of the current sensing resistor.

9. The switching converter of claim 8, wherein the switching transistor has a parasitic capacitor between the drain end of the switching transistor and a source end of the switching transistor.

* * * * *